US010145483B2

(12) United States Patent
Laureys et al.

(10) Patent No.: US 10,145,483 B2
(45) Date of Patent: Dec. 4, 2018

(54) CORROSION-RESISTANT BALL VALVE

(71) Applicant: INNO-MOULD NV, Beveren (BE)

(72) Inventors: Eddy Laureys, Haasdonk (BE); Mario Laureys, Beveren (BE); Benno Schmid, Welschenrohr (CH)

(73) Assignee: INNO-MOULD NV, Beveren (BE)

( * ) Notice: Subject to any disclaimer, the term of this patent is extended or adjusted under 35 U.S.C. 154(b) by 0 days.

(21) Appl. No.: 15/614,424

(22) Filed: Jun. 5, 2017

(65) Prior Publication Data
US 2017/0350522 A1 Dec. 7, 2017

(30) Foreign Application Priority Data

Jun. 3, 2016 (BE) .................................. 2016/5415

(51) Int. Cl.
| F16K 25/00 | (2006.01) |
| F16K 5/06 | (2006.01) |
| F16K 5/20 | (2006.01) |
| F16K 27/06 | (2006.01) |

(52) U.S. Cl.
CPC .......... F16K 25/005 (2013.01); F16K 5/0657 (2013.01); F16K 5/0673 (2013.01); F16K 5/20 (2013.01); F16K 27/067 (2013.01)

(58) Field of Classification Search
CPC .... F16K 25/005; F16K 27/067; F16K 5/0657; F16K 5/0673; F16K 5/20
USPC ............... 251/214, 315.01–315.16; 137/375
See application file for complete search history.

(56) References Cited

U.S. PATENT DOCUMENTS

| 3,073,336 | A | * | 1/1963 | Johnson | ................ | F16K 5/0657 |
| | | | | | | 137/375 |
| 3,227,174 | A | * | 1/1966 | Yost | ...................... | F16K 5/0657 |
| | | | | | | 137/375 |
| 3,336,939 | A | * | 8/1967 | Freed | .................... | F16K 5/0689 |
| | | | | | | 137/375 |
| 3,703,910 | A | * | 11/1972 | Smith | ..................... | F16K 5/162 |
| | | | | | | 137/375 |
| 3,825,030 | A | | 7/1974 | Kalsi | | |
| 4,288,896 | A | * | 9/1981 | West | .................... | B23P 15/001 |
| | | | | | | 264/263 |
| 4,696,323 | A | * | 9/1987 | Iff | ........................ | F16K 5/0657 |
| | | | | | | 137/375 |

(Continued)

FOREIGN PATENT DOCUMENTS

| DE | 3023230 A1 | 1/1982 |
| DE | 44 14 716 A1 * | 7/1995 |

(Continued)

OTHER PUBLICATIONS

Belgian Search Report dated Aug. 2, 2017.
European Search Report dated Sep. 27, 2017.

*Primary Examiner* — John Bastianelli
(74) *Attorney, Agent, or Firm* — Symbus Law Group, LLC; Clifford D. Hyra

(57) ABSTRACT

A corrosion-resistant ball valve (15) comprising a housing (1; 2), in which a spherical sealing member (3) provided with a passage duct is rotatably arranged and an operating spindle (4) which is detachably coupled to the sealing member (3), in which the sealing member (3) is provided with an uninterrupted corrosion-resistant coating layer (16a), in which said coating layer comprises a tubular part (16b) which surrounds at least a part of the operating spindle (4) and a method for producing such a ball valve (15).

9 Claims, 2 Drawing Sheets

(56) References Cited

U.S. PATENT DOCUMENTS

| | | | | |
|---|---|---|---|---|
| 5,031,876 A * | 7/1991 | Giacomini | ............ | F16K 5/0647 |
| | | | | 251/312 |
| 5,979,491 A * | 11/1999 | Gonsior | ................ | F16K 41/026 |
| | | | | 137/375 |
| 6,161,569 A * | 12/2000 | Gonsior | ................ | F16K 5/0689 |
| | | | | 137/375 |
| 6,186,476 B1 * | 2/2001 | Goldsweer | ............ | F16K 27/067 |
| | | | | 251/315.13 |
| 6,591,859 B2 * | 7/2003 | Shih | ...................... | F16K 5/0657 |
| | | | | 137/375 |
| 8,360,092 B2 * | 1/2013 | Tappe | ................... | F16K 5/0689 |
| | | | | 137/375 |
| 8,579,256 B2 * | 11/2013 | Wetzel | .................. | F16K 5/0647 |
| | | | | 251/315.01 |
| 8,910,921 B2 * | 12/2014 | Crochet, Sr. | .......... | F16K 5/0694 |
| | | | | 251/214 |
| 2005/0104026 A1 * | 5/2005 | Tulaskar | ............... | F16K 5/0642 |
| | | | | 251/315.01 |
| 2015/0090916 A1 * | 4/2015 | Zollinger | .............. | F16K 5/0694 |
| | | | | 251/214 |

FOREIGN PATENT DOCUMENTS

| | | | |
|---|---|---|---|
| DE | 199 43 937 A1 * | 3/2000 | |
| EP | 0242927 A1 | 10/1987 | |
| GB | 970 507 A * | 9/1964 | |
| WO | 03071172 A1 | 8/2003 | |

* cited by examiner

CORROSION-RESISTANT BALL VALVE

This application claims the benefit of Belgian patent applications No. 2016/5415, filed Jun. 3, 2016, which is hereby incorporated by reference in its entirety.

FIELD OF THE INVENTION

The present invention relates to, on the one hand, a corrosion-resistant ball valve comprising a housing, in which a spherical sealing member provided with a passage duct is rotatably arranged and an operating spindle which is detachably coupled to the sealing member. On the other hand, the present invention relates to a method for producing such a valve.

BACKGROUND

In the water supply, gas supply, chemical industry, etc. . . . use is often made of a ball valve (spherical valve) to open or close pipes. Such a valve will completely or partially close off the flow of a liquid or gas by means of a sealing member in the form of a drilled sphere (ball) which is rotatable about its axis at right angles to the bore. By rotating the ball through 90°, the valve either moves from being open to being closed or vice versa.

Currently, there are two types available on the market. The first type has two separate inner components (sealing member and operating spindle) which are connected to each other via a lock connection and are each provided with a corrosion-resistant fluoropolymer coating layer. This type has the advantage that, in use, the sealing member is always pressed against the seal by means of the medium flowing through the ball valve (floating ball principle) and thus results in a perfect seal. The operating forces which are transmitted via the lock connection are unfortunately passed directly onto the plastic coatings of both components. In the case of intense use, this may result in damage to the plastic coatings, as a result of which the corrosion resistance is no longer guaranteed. Such a ball valve is shown in FIG. 9 of the US patent publication U.S. Pat. No. 3,825,030.

With the other type of ball valve, in which the sealing member and the operating spindle are formed as a single part, there is no risk of damage to the fluoropolymer coating as there is no lock connection. However, such valves have a different drawback, i.e.: if the ball is pushed into the sealing ring (seats) as a result of the internal medium pressure; then this will also lead to a slight displacement of the ball. Since the ball and spindle are formed as a single part, the operating spindle will also be displaced slightly, as a result of which the sealing kit provided in the space between the housing and the operating spindle will be subjected to an eccentric load. In most cases, this will lead to leakage. Such a type of (single-part) ball valve is described, inter alia, in the following patent publications: EP 0 242 927 A1, DE 44 14 716 A1, in FIGS. 1 to 8 of U.S. Pat. No. 3,825,030 A, DE 30 23 230 A1 and WO 03/071172 A1.

SUMMARY

It is an object of the present invention to provide a corrosion-resistant ball valve of the first type—in which the sealing member and operating spindle are detachably connected to each other—which no longer has the respective drawbacks and which will consequently have a much longer corrosion resistance.

The object of the invention may be achieved by providing a corrosion-resistant ball valve comprising a housing in which a spherical sealing member provided with a passage duct is rotatably arranged and an operating spindle which is detachably coupled to the sealing member, in which the sealing member is provided with an uninterrupted corrosion-resistant coating layer, and in which said coating layer comprises a tubular part which surrounds at least a part of the operating spindle. This has the advantage that the operating forces which are transmitted via the connection between both parts no longer pass directly to the coating layer of both parts, as is the case with the known (first) type of ball valve. According to the present invention, there is an uninterrupted (single-part) coating layer which surrounds both the sealing member and a part of the operating spindle, so that this layer will consequently no longer be damaged due to, for example, the movement between the sealing member and the operating spindle with respect to each other, and the corrosion resistance will thus last much longer.

In an embodiment of the ball valve according to the invention, the sealing member and the operating spindle are mechanically coupled to each other via a detachable lock connection. The lock connection may be a connection on the basis of a tongue/groove system. In particular, the lock connection is made from the same material as the sealing member.

In another embodiment of the ball valve according to the invention, said ball valve furthermore comprises a sealing element provided for the leak-proof sealing of the space between the housing and the operating spindle. The tubular part of the coating layer in particular extends beyond the sealing element. Due to the fact that the sealing member and the operating spindle are provided with an uninterrupted coating layer, only one layer will be present at the location of the transition surface between the sealing element and the operating spindle, as a result of which both parts are coupled to each other inside the coating layer, as it were. More particularly, the coating layer is configured to be dimensionally stable. The coating layer in particular comprises a spherical part which surrounds the sealing member, and an upright tubular part which surrounds at least a part of the operating spindle, preferably at least the part where the connection with the sealing member is. In use, a part of the operating spindle will serve as a support for the tubular part.

In another embodiment of the ball valve according to the invention, the coating layer is a fluoropolymer layer. In a specific embodiment, the housing comprises two housing halves.

According to a more specific embodiment of the ball valve according to the invention, the ball valve comprises a spring which is suitable for providing a constant pressure on the sealing element.

Another subject of the present invention relates to a method for producing a corrosion-resistant ball valve comprising a housing, in which a spherical sealing member provided with a passage duct is rotatably arranged, an operating spindle which is detachably coupled to the sealing member, and a sealing element which is provided to seal the space between the housing and the operating spindle in a leak-proof manner, in which an uninterrupted dimensionally stable corrosion-resistant coating layer is applied to the sealing member and the operating spindle, after the sealing member has been coupled to the operating spindle, so that a single-part coating layer with a spherical and a tubular part is formed, in which the tubular part surrounds at least a part of the operating spindle.

The method according to the invention is provided to produce a ball valve according to the invention as described above.

BRIEF DESCRIPTION OF THE DRAWINGS

In order to further illustrate the properties of the present invention and to indicate additional advantages and particulars thereof, a more detailed description of the corrosion-resistant ball valve according to embodiments of the present invention will now be given. It should be clear that nothing in the following description may be interpreted as a limitation of the scope of protection for the present invention defined in the claims.

Reference numerals are used in this description to refer to the attached drawings, in which.

DETAILED DESCRIPTION OF EMBODIMENTS

Figure 1:
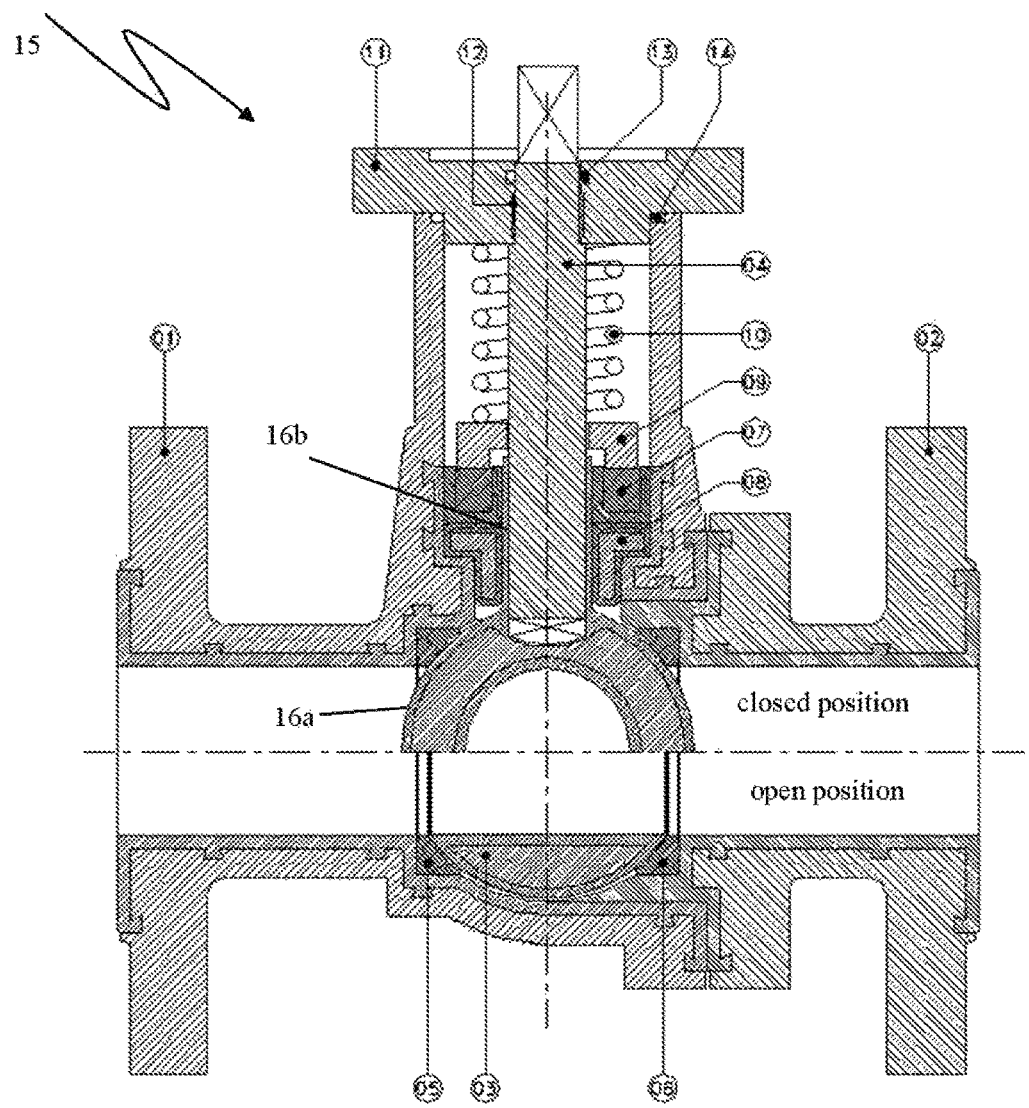
FIG. 1 is an illustration of the cross section of a ball valve according to an embodiment of the invention in which the sealing member is shown once in the open and once in the closed position.

The invention relates to a change in concept with regard to the conventional fluoropolymer-coated ball valves. In a two-part housing, a spherical sealing member (3) (ball) provided with a passage (duct) for liquids or gases rotates. The sealing member (3) is rotatable about its axis at right angles to the bore. By rotating the sealing member (3) through 90°, the valve (15) either moves from being open to being closed or vice versa. The housing is made of cast iron or stainless steel. In the open position, the passage of the ball (3) is positioned in the direction of flow, in the closed position at right angles to the direction of flow. The ball (3) has a metal core, such as e.g. steel, stainless steel, bronze or another material, which is provided with a corrosion-resistant fluoropolymer coating layer (16a; 16b). A mechanical lock connection, e.g. in the form of a groove, is provided in the metal core of the ball (3) into which the operating spindle (4) engages in order to be able to perform the rotation of the ball.

Figure 2:
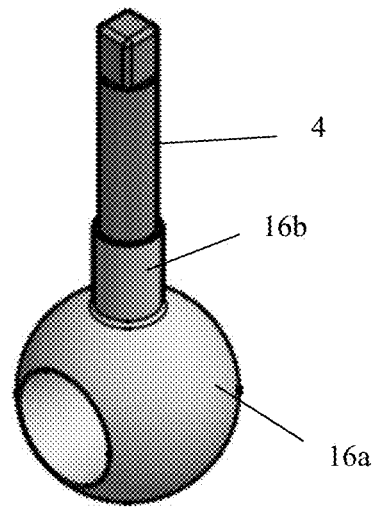
FIG. 2 is an illustration of the sealing member and the operating spindle of the ball valve according to an embodiment of the invention in the connected position.
Figure 3:
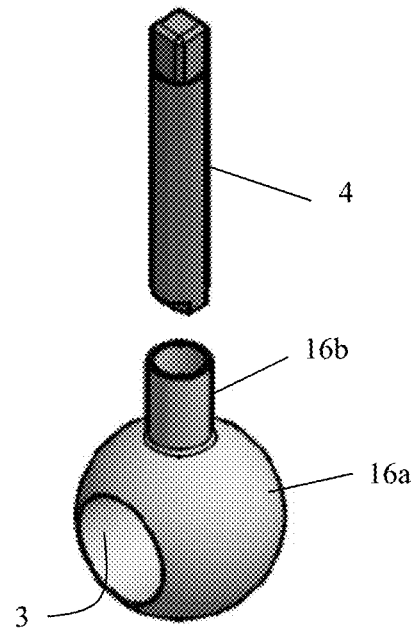
FIG. 3 is an illustration of the sealing member and the operating spindle of the ball valve according to an embodiment of the invention in the non-connected position.
Figure 4:
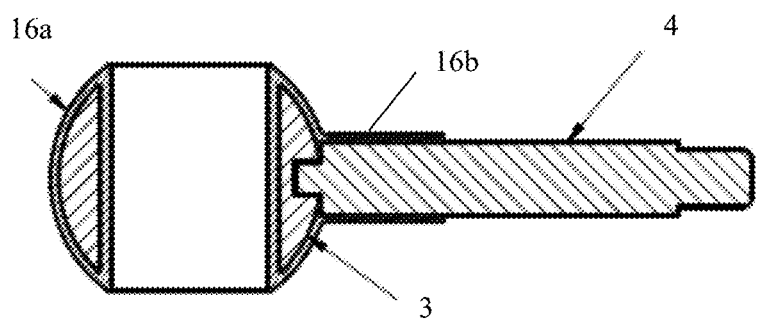
FIG. 4 shows a cross section of the sealing member and the operating spindle in the connected position.

According to the present invention, the coating layer (16a; 16b) which is provided around the ball (3) runs uninterrupted as far as at least a part of the operating spindle (4). In this way, as is illustrated in detail on FIGS. 2 to 4, a coating layer is formed having a spherical part (16a) and a tubular (16b) part. The spherical part (16a) surrounds the spherical sealing member (3) and the tubular part (16b) surrounds a part of the operating spindle (4). The coating layer (16a; 16b) is made from a dimensionally stable material. In use, a part of the operating spindle (4) will serve as a support for the tubular part (16b) of the coating. The operating spindle (4) can still be uncoupled from the sealing member in an easy manner.

The ball/spindle combination which is provided with the coating layer (16) rotates between two annular seats (5, 6) made of plastic (e.g. PTFE). These seats (5, 6) will ensure sealing of the valve in the closed position. These seat rings (5, 6) are in turn positioned in the two housing halves (1, 2).

A spring-loaded spindle sealing (7) provides a leak-proof dynamic seal between the coating of the spindle and the coating of the housing in order to prevent leaking of internal media to the outside environment. The spindle seal (7) is also provided with a corrosion-protecting outer layer and is supported by a corrosion-free reduction ring.

The seats (5) and (6) are positioned in the fluoropolymer-coated housing halves (1, 2). Between these seats, the fluoropolymer-coated ball (3) rotates, in which a detachably inserted spindle (4) is fitted. The ball may be configured as a complete ball shape or as a C segment. The coating of the ball runs up to at least the level of the spindle sealing (7) in order to protect the spindle (4) from corrosion. The spindle sealing (7) is supported by a reduction piece (8) and pushed down by pressure ring (9). The pressure ring (9) is pressed down by a spring (10) which is surrounded by the top flange (11). The top flange also ensures the anti-blowout function, so that the spindle cannot slip out of the housing. This is mounted in the top flange (11) via mounting bush (12). O-rings (13) and (14) prevent rainwater or external media from seeping into the ball valve.

The ball valve (15) differs from the existing types by the two-part arrangement ball/spindle, as a result of which the ball is arranged in a floating manner, with mechanical lock connection of the metal core parts which are coated by a single-part fluoropolymer coating when assembled.

The ball valve (15) according to embodiments of the invention makes it possible to produce a floating ball system comprising a lock connection between the metal parts and to keep the corrosion protection as a single piece beyond the spindle.

The invention claimed is:

1. Method for producing a corrosion-resistant ball valve comprising a housing, in which a spherical sealing member provided with a passage duct is rotatably arranged, an operating spindle which is detachably coupled to the spherical sealing member, and a sealing element which is provided to seal the space between the housing and the operating spindle in a leak-proof manner, wherein in the coupled position the spherical sealing member and the operating spindle are movable with respect to each other and an uninterrupted dimensionally stable corrosion-resistant coating layer is applied on the spherical sealing member and on the operating spindle, after the spherical sealing member has been coupled to the operating spindle, so that a single-part coating layer with a spherical and a tubular part is formed, in which the tubular part surrounds and is immediately adjacent at least a part of the coupled operating spindle such that the spindle moves without restriction within the tubular part.

2. Corrosion-resistant ball valve comprising a housing in which a spherical sealing member provided with a passage duct is rotatably arranged and an operating spindle which is detachably coupled to the spherical sealing member, wherein in the coupled position the spherical sealing member and the operating spindle are movable with respect to each other, and the spherical sealing member is provided with an uninterrupted corrosion-resistant coating layer, in which said coating layer comprises a tubular part which surrounds and is immediately adjacent at least a part of the coupled operating spindle such that the spindle moves without restriction within the tubular part.

3. Corrosion-resistant ball valve according to claim 2, characterized in that the spherical sealing member and the operating spindle are mechanically coupled to each other via a detachable lock connection.

4. Corrosion-resistant ball valve according to claim 2, characterized in that said ball valve furthermore comprises a sealing element provided for the leak-proof sealing of the space between the housing and the operating spindle.

5. Corrosion-resistant ball valve according to claim 4, characterized in that the tubular part of the coating layer extends beyond the sealing element.

6. Corrosion-resistant ball valve according to claim 2, characterized in that the coating layer is configured to be dimensionally stable.

7. Corrosion-resistant ball valve according to claim 2, characterized in that the coating layer is a fluoropolymer layer.

8. Corrosion-resistant ball valve according to claim 2, characterized in that the housing comprises two housing halves.

9. Corrosion-resistant ball valve according to claim 4, characterized in that the ball valve comprises a spring which is suitable for providing a constant pressure on the sealing element.

* * * * *